(12) United States Patent
Wideman et al.

(10) Patent No.: US 8,320,569 B2
(45) Date of Patent: Nov. 27, 2012

(54) GENERATING UNIQUE ALIASES FOR KEYS USED WITH TAPE LIBRARIES

(76) Inventors: Roderick B. Wideman, Shakopee, MN (US); Darryl A. Torske, Rowlett, TX (US)

( * ) Notice: Subject to any disclaimer, the term of this patent is extended or adjusted under 35 U.S.C. 154(b) by 762 days.

(21) Appl. No.: 12/246,770

(22) Filed: Oct. 7, 2008

(65) Prior Publication Data

US 2010/0086135 A1 Apr. 8, 2010

(51) Int. Cl.
*H04L 9/00* (2006.01)
(52) U.S. Cl. ........................................................ 380/277
(58) Field of Classification Search .................. None
See application file for complete search history.

(56) References Cited

U.S. PATENT DOCUMENTS

| | | | | |
|---|---|---|---|---|
| 5,144,665 | A * | 9/1992 | Takaragi et al. | 380/30 |
| 5,886,894 | A * | 3/1999 | Rakoff | 700/3 |
| 6,144,742 | A * | 11/2000 | Gotoh et al. | 369/53.21 |
| 6,269,382 | B1 * | 7/2001 | Cabrera et al. | 1/1 |
| 6,732,010 | B1 * | 5/2004 | Ochs et al. | 700/214 |
| 6,795,834 | B2 * | 9/2004 | Higashiura et al. | 1/1 |
| 6,856,985 | B1 * | 2/2005 | Pierce et al. | 1/1 |
| 7,272,727 | B2 * | 9/2007 | Mimatsu | 713/193 |
| 7,610,432 | B2 * | 10/2009 | Azuma | 711/4 |
| 2002/0002561 | A1 * | 1/2002 | Higashiura et al. | 707/204 |
| 2002/0110244 | A1 * | 8/2002 | Flanagan et al. | 380/277 |
| 2003/0126360 | A1 * | 7/2003 | Camble et al. | 711/114 |
| 2003/0200176 | A1 * | 10/2003 | Foster et al. | 705/51 |
| 2004/0107342 | A1 * | 6/2004 | Pham et al. | 713/165 |
| 2004/0177287 | A1 * | 9/2004 | Azuma | 714/7 |
| 2005/0033911 | A1 * | 2/2005 | Kitamura et al. | 711/111 |
| 2006/0143305 | A1 * | 6/2006 | Mason et al. | 709/238 |
| 2006/0215305 | A1 * | 9/2006 | Yasue et al. | 360/71 |
| 2006/0224852 | A1 * | 10/2006 | Kottomtharayil et al. | 711/170 |
| 2007/0083759 | A1 * | 4/2007 | Drew et al. | 713/168 |
| 2008/0082836 | A1 * | 4/2008 | Osaki | 713/193 |
| 2008/0165973 | A1 * | 7/2008 | Miranda Gavillan et al. | 380/278 |
| 2008/0294906 | A1 * | 11/2008 | Chang et al. | 713/182 |

FOREIGN PATENT DOCUMENTS

JP 2003208355 * 7/2003

OTHER PUBLICATIONS

IEEE (IEEE, "Guidelines for use of a 60-bit Extended Unique Identifier (EUI-60TM)", Apr. 2004), published at http://grouper.ieee.org/groups/msc/MSC200407/OnlineTutorialsC/EUI60.htm.*

* cited by examiner

*Primary Examiner* — Peter Poltorak

(57) ABSTRACT

Unique key aliases are generated for tape libraries. According to one embodiment, a first library identifier associated with a first tape library, which does not conflict with a second library identifier associated with a second tape library, is generated. One library identifier is associated with each of the tape libraries. A unique key alias, which does not conflict with any key aliases associated with the first tape library and does not conflict with any key aliases associated with the second tape library, is generated based on the first library identifier. Tape data is encrypted based on a data key that is identified with the unique key alias as a part of writing the tape data to the first tape library.

15 Claims, 3 Drawing Sheets

GENERATING UNIQUE ALIASES FOR KEYS USED WITH TAPE LIBRARIES

BACKGROUND

Frequently companies have data that they want only authorized persons to be able to access. Typically the data is encrypted to prevent unauthorized people from accessing the data. Keys are used to encrypt data. Encrypted data cannot be read unless it is decrypted with keys.

A key is typically difficult to remember or to type. Therefore, information technology (IT) personnel typically use what is known as "an alias" instead of a corresponding key. For example, the IT personnel may type an alias instead of the corresponding key when there is a need to encrypt or decrypt data, among other things. A key alias can be used to identify the appropriate key for encrypting data. A key and its corresponding alias shall be referred to as a "key-alias pair."

SUMMARY

Unique key aliases are generated for tape libraries. According to one embodiment, a first library identifier associated with a first tape library, which does not conflict with a second library identifier associated with a second tape library, is generated. One library identifier is associated with each of the tape libraries. A unique key alias, which does not conflict with any key aliases associated with the first tape library and does not conflict with any key aliases associated with the second tape library, is generated based on the first library identifier. Tape data is encrypted based on a data key that is identified with the unique key alias as a part of writing the tape data to the first tape library.

DESCRIPTION OF THE DRAWINGS

The accompanying drawings, which are incorporated in and form a part of this specification, illustrate embodiments of the subject matter and, together with the description, serve to explain principles discussed below.

Figure 1:
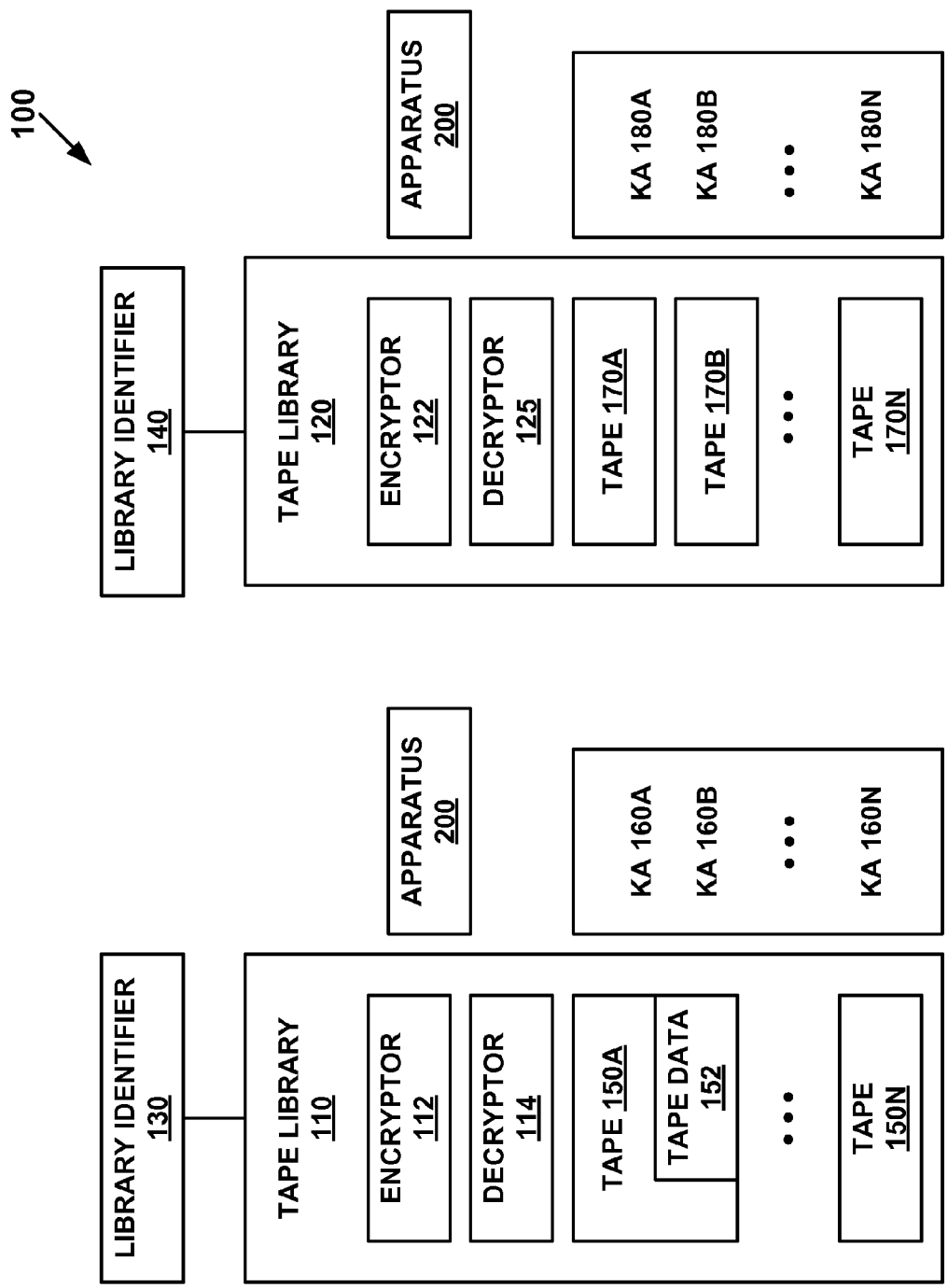
FIG. 1 is a block diagram of a system that uses an apparatus for generating unique aliases for keys used with tape libraries, according to one embodiment.

The drawings referred to in this description should be understood as not being drawn to scale unless specifically noted.

DETAILED DESCRIPTION

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the following detailed description, numerous specific details are set forth in order to provide a thorough understanding of embodiments of the subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the detailed description, discussions utilizing terms such as "accessing," "generating," "encrypting," "transmitting," "unwrapping," "receiving," "using," "communicating," or the like, refer to the actions and processes of a computer system, data storage system, storage system controller, microcontroller, processor, or similar electronic computing device or combination of such electronic computing devices. The computer system or similar electronic computing device manipulates and transforms data represented as physical (electronic) quantities within the computer system's/device's registers and memories into other data similarly represented as physical quantities within the computer system's/device's memories or registers or other such information storage, transmission, or display devices.

Overview of Discussion

Tape libraries are typically mechanical devices that include a multitude of tapes for storing data. The tapes associated with a tape library are typically tape cartridges. A tape library may include slots for storing tapes, and tape drives for reading data from and writing data to the tape library's tapes. The tape library may also include an apparatus for retrieving a tape from its slot and inserting it into a tape drive when a program requests to access the tape. The apparatus would then return the tape drive to its slot once the request for writing the data to the tape had completed. A management apparatus associated with the tape library keeps track of which slots the tapes reside in.

Frequently, companies want to protect their data that is stored on tapes using encryption. Data that is stored on a tape shall be referred to herein as "tape data." Further, companies want to be able to share their tape data between various organizations within their company as well as with other companies in a manner that protects their tape data.

For example, assume that there is a need to transport tape A from tape library A' to tape library B'. To date, there is no way of ensuring that the aliases used as a part of encrypting the data on tape A will not conflict with any of the aliases used as a part of encrypting data stored on tapes associated with tape library B'. The key aliases are used to identify data keys for encrypting the data. Therefore, there is a need for generating a key alias that will not conflict with any other key aliases associated with two tape libraries.

As will become more evident, a tape library may communicate with a key manager that is responsible for generating and storing keys. Since key managers generate keys, key managers are aware of conflicts between aliases.

Tape Libraries

Tape libraries may be physical tape libraries or may be virtual tape libraries. For example, one physical tape library may be logically partitioned into two or more virtual tape libraries that "appear" to be physical tape libraries to programs, among other things, that request to write data to a tape or read data from a tape associated with the virtual tape libraries. A virtual tape library may include only software and disk drives so that the virtual tape library does not include any physical tapes. The term "tape library" shall be used to refer to either a physical tape library or virtual tape library.

As will become more evident, various embodiments can be used for tape libraries A' and B' that are owned or used by the same company, or owned or used by different companies. Further, as will become more evident, various embodiments can be used for tape libraries A' and B' that are manufactured by the same company, or manufactured by different companies.

Tape Data

As already stated, data can be stored on tapes that are associated with a tape library. A tape drive receives a stream of data and writes the stream of data to the tape. A stream of data may be written as what is commonly referred to as a "record." The next stream of data that is written to the same tape may be written to another record. A record has markers that indicate the beginning and the end of the record. The term "tape data" shall be used to refer to either a record or all of the data that has been written to a tape. As will become more evident, a key alias can be stored on a tape. Therefore, a key alias also qualifies as "tape data."

Tape data may be communicated from a first tape library to a second tape library by transmitting the tape data over a network or by physically moving the tape that the tape data is stored on from the first tape library to the second tape library.

Keys

A key can be used to encrypt all of the data stored on a tape. Alternatively, different keys may be used for encrypting each record on a tape. The keys that are used to encrypt data stored on a tape shall be referred to as "data keys."

Two types of encryption are symmetric encryption and asymmetric encryption. Asymmetric encryption involves a public key and a private key. For example, assume that one entity wants to communicate data to another entity in a secure manner. The first entity shall be referred to as the sender and the second entity shall be referred to as the recipient. The sender can request the recipient's public key and use the recipient's public key as a part of encrypting data in preparation of sending the data to the recipient. After the data has been communicated to the recipient, the recipient can decrypt the data with its private key, which is only known to the recipient and corresponds to its public key. A certificate can be used to authenticate that a public key belongs to a particular entity.

Symmetric encryption involves one key. With symmetric encryption, the same key is used to encrypt and decrypt data. For example, both the sender of tape data and the recipient of the tape data use the same key to encrypt and decrypt the tape data.

Key Managers

A key manager (also known as a "key server") provides keys to a tape drive and manages those keys. For example, when a tape drive receives a request to write data to a tape, the tape drive requests a data key from the key manager in order to encrypt the stream of data that will be written to the tape in response to the request. When the tape drive receives a request to read tape data, the tape drive requests the appropriate data key from the key manager in order to decrypt the tape data.

Typically, there is one key manager per tape library. However, there may be more than one key manager for a tape library or one key manager may be associated with two or more tape libraries. If a physical tape library is divided into a plurality of virtual tape libraries, each of the virtual tape libraries may have its own key manager or two or more virtual tape libraries may share a key manager. Typically, each key manager has its own certificate that is associated with its public key.

The process of moving keys and corresponding aliases from one key manager to another key manager as a part of communicating tape data over a network or moving a tape from one tape library to another tape library is referred to as exporting keys and aliases from a first key manager and importing them into a second key manager.

Aliases

When tape data is communicated from one tape library to another tape library by moving the tape or by transmitting the tape data over a network, the key-alias pairs that are used as a part of encrypting and decrypting the tape data are also communicated along with the tape data. The data keys themselves may also be encrypted using for example a public key associated with a certificate, which also has an alias. The aliases of the data keys shall be referred to as "key aliases" and the aliases for the certificates shall be referred to as "certificate aliases." The term "alias" shall be used to refer to any type of alias.

An alias that does not conflict with any of the aliases associated with two or more libraries shall be referred to as a "unique alias." The unique alias may be a unique key alias or a unique certificate alias.

When tape data is communicated from a first tape library to a second tape library, according to one embodiment, the second tape library uses a unique key alias generated by the first tape library to identify a data key for decrypting the communicated tape data. For example, tape data can be communicated by moving a tape from the first tape library to the second tape library. In another example, the tape data is transmitted over the network from the first tape library to the second tape library. If the tape data is transmitted, the second tape library can store the communicated tape data on one of its own tapes and use one of its own unique key aliases to re-encrypt the transmitted tape data.

Aliases are also commonly known as key names or key identifiers.

Unique Library Identifiers

The term "library identifier" shall be used to refer to identifiers that identify a tape library. A key alias can be created based on a library identifier, for example, by appending a range to the library identifier. For example, assume that the library identifier is XXXXXX. A range of key aliases for that tape library could be designed with two parameters XXXXXXRRRR-XXXXXXRRRR where the RRRRs associated with the two parameters represent a range from 0001 to FFFF, for example.

According to one embodiment, a unique library identifier is used as a part of creating an alias that does not conflict with any aliases associated with two tape libraries. A library identifier that does not conflict with any of the library identifiers associated with two or more tape libraries is referred to as a "unique library identifier."

Since, according to one embodiment, a key alias and a certificate alias are generated based on a library identifier (unique library identifier) that is associated with one tape library, the key alias and corresponding certificate alias will not conflict with any of the key aliases or corresponding certificate aliases associated with the first and second tape libraries. For example, assume that a tape library is being installed. As a part of the installation, IT personnel may input a library identifier or the tape library may access a library identifier, for example, by reading a bar code associated with the tape library or by accessing a library identifier that was associated with the tape library when it was manufactured. A certificate alias can be generated based on the library identifier. Key aliases can be generated based on the library identifier by appending a range to the library identifier. A key alias from the range of generated key aliases can be assigned to a piece of tape data when the tape library receives a request to write the piece of tape data to a tape in the tape library.

In the event that a physical tape library is divided into a plurality of virtual tape libraries, an identifier that uniquely identifies the physical tape library can be used to generate library identifiers that uniquely identify the virtual tape libraries. For example, the format for library identifiers could include a physical library identifier and an additional identifier that uniquely distinguishes a virtual tape library from other virtual tape libraries associated with the same physical tape library. The additional identifier could be alphanumeric or hexadecimal, among other things.

According to one embodiment, a unique library identifier may be assigned by personnel that coordinate efforts to ensure that the library identifiers associated with the two tape libraries do not conflict. The library identifiers may be entirely determined by the personnel or available information may be used as a part of determining the library identifiers. Examples of available information that may be used include, but are not limited to, a tape library's serial number, a World Wide Name (WWN), and a MAC address.

A governing body may assign library identifiers in a manner that ensures they are unique. For example, the governing body may have a pool of sequential numbers that they assign one after the other as the identifiers are requested. One example of an existing governing body that assigns identifiers and ensures their uniqueness is Institute of Electrical and Electronics Engineers (IEEE). For example, the IEEE assigns Organizationally Unique Identifiers (OUIs) and a range of numbers. Companies can create WWNs from the OUIs and the range of numbers that were assigned to them. The company can self-manage the range of numbers to ensure that none of their libraries have the same WWN. Not all libraries have WWNs. Therefore, according to another embodiment, IT personnel, for example, can coordinate efforts to ensure that library identifiers associated with two or more tape libraries do not conflict.

A tape library's serial number and the WWN are usually printed on a label that is attached to a library. IT personnel can input the tape library's serial number or parts of the WWN into a key manager, for example, during installation. A tape library's serial number is typically unique for tape libraries manufactured by a particular company.

The IEEE coordinates assigning OUIs, which are used to create WWNs, to devices, such as tape libraries. Therefore, information associated with a WWN can be used to create a library identifier that does not conflict with any other library identifier for any other tape library that also has a WWN. For example, an Organizationally Unique Identifier (OUI), which includes 24 bits and is a part of a WWN, uniquely identifies all companies that have been assigned OUIs. The symbol "OOUUII" shall be used to refer to the 24 bit OUI. The WWN also includes another 24 bits that is unique for all products made by a particular manufacturer, referred to as "manufacturing assigned portion." The symbol NNNNNN shall be used to refer to the 24 bit manufacturing assigned portion of the WWN. The uniquely identifies products produced by a manufacturer. Therefore, the combination of OOUUII and NNNNNN can be used to provide globally unique library identifiers.

According to a first embodiment, library identifiers are unique for two tape libraries. For example, none of the library identifiers associated with the two libraries conflict with each other. According to a second embodiment, library identifiers are unique for the tape libraries that are owned or used by a company. According to a third embodiment, library identifiers are unique for the tape libraries that are owned and used by two or more companies. According to a fourth embodiment, library identifiers are unique for the tape libraries that are manufactured by a company. According to a fifth embodiment, library identifiers are unique for tape libraries that are manufactured by two or more companies that manufacture tape libraries. According to a sixth embodiment, library identifiers are unique for all of the tape libraries that have WWNs that were created based on OUIs.

Typically a tape library's serial number is unique for all tape libraries manufactured by a particular company. However, tape library serial numbers are not unique across all companies that manufacture tape libraries. In other words, some of the serial numbers for tape libraries manufactured by company C may be the same as the serial numbers for tape libraries manufactured by company D. According to another embodiment, the combination of the OOUUII and NNNNNN, which is unique for all tape libraries that have WWNs (referred to herein as "globally unique"), is used as a part of generating alias, as will become more evident.

Formats and User Interfaces

A unique key alias can be created by appending a unique identifier onto a unique library identifier. For example, assume that the unique library identifier is XXXXXX. A unique identifier such as 1234 can be appended onto the XXXXXX resulting in a unique key alias of XXXXXX1234, for example, for one piece of tape data. In another example, a range of key aliases can be specified with a format such as XXXXXXRRRR-XXXXXXRRRR where the RRRRs in the two parameters are used to determine a range. In a specific example, the parameters XXXXXX0000-XXXXXX03FF could be used to generate key aliases that range from 0000 to 03FF in hexadecimal resulting in data key aliases that range from XXXXXX0000 to XXXXXX03FF.

One format for a library identifier may be based on the tape library's serial number. In this case, a key alias can be determined by appending a unique identifier onto the tape library's serial number.

Another format of a library identifier may be based on a hexadecimal value OOUUIINNNNNN where OOUUII represents the 24 bit Organizational Unique Identifier (OUI) from the tape library's World Wide Name (WWN) and NNNNNN represents the 24 bit manufacturing assigned portion of the WWN. In this case, the key aliases for that tape library can be determined by appending a range represented by RRRR such that a tape data identifier's format is OOUUI-INNNNNNRRRR, according to one embodiment. The range RRRR could range from 0001 to FFFF in hexadecimal.

IT personnel can use a command line interface (CLI) to input a unique tape data identifier or a range into a key manager. For example, the format of the command line for inputting parameters for generating a range of key aliases may be "aliasrange keyOOUUIINNNNNNRRRR-keyOO-UUIINNNNNNRRRR." For example, assume that the OUI for a company is 00000000 and the NNNNNN for the manufacturing assigned portion of the WWN is 09C40A and the range is 0000-03FF. In this case the generated range of key aliases would be key0000000009C40A0000-key0000000009C40A03FF.

Linear Tape Open

Linear Tape Open (LTO) is a consortium that defines the format of data written to tapes. LTO has defined a 12 byte field for storing aliases onto tapes. Therefore, aliases stored on tape are limited to being 12 bytes long. According to one embodiment, the format for generating aliases conforms to LTO. Referring back to the previous example, the OOUUII, NNNNNN, and the range RRRR result in 8 bytes. The "key" in the command line "aliasrange keyOOUUIINNNNNNR-RRR" is 3 bytes. 8 bytes plus 3 is 11 bytes.

Note that in this example, an additional byte "00" was appended to both of the input parameters "key00000009C40A0000" and "key00000009C40A03FF" resulting in the generated key alias range "key0000000009C40A0000-key0000000009C40A03FF." Both of the generated parameters "key0000000009C40A0000" and "key0000000009C40A03FF" have an additional "00" appended to the beginning resulting in each of the generated parameters being 12 bytes. The 12 bytes conforms to the LTO's requirement of aliases being 12 bytes.

A System That Uses an Apparatus for Generating Unique Aliases for Keys Used with Tape Libraries FIG. 1 is a block diagram of a system 100 that uses an apparatus 200 for generating unique aliases for keys used with tape libraries, according to one embodiment. The blocks that represent features in FIG. 1 can be arranged differently than as illustrated, and can implement additional or fewer features than what are described herein. Further, the features represented by the blocks in FIG. 1 can be combined in various ways. The system 100 can be implemented using software, hardware, firmware, or a combination thereof.

FIG. 1 depicts a first tape library 110 and a second tape library 120. The tape libraries 110 and 120 include tapes 150A-150N and tapes 170A-170N, encryptors 112 and 122, and decryptors 114 and 124. The respective tape libraries 110 and 120 communicate with the respective apparatuses 200, according to one embodiment. According to another embodiment, the tape libraries 110, 120 include their respective apparatuses 200. The apparatuses 200 are used for generating unique aliases for the tape libraries 110 and 120, according to one embodiment, as will become more evident. Each tape library 110 and 120 has a unique tape library identifier 130, 140 associated with it. Respective key aliases 160A-160N and 180A-180N are associated with the tape libraries 110 and 120. The key aliases may reside in key managers that are a part of the tape libraries 110, 120 or that are separate and communicatively coupled to the tape libraries 110, 120. The key aliases may be stored separately from the apparatuses 200. Although, for the sake of simplicity, FIG. 1 only depicts tape data 152 for one tape 150A, many of the tapes 150B-150N, 170A-170N associated with the tape libraries 110 and 120 may include tape data.

An Apparatus for Generating Unique Aliases for Keys Used with Tape Libraries

Figure 2:
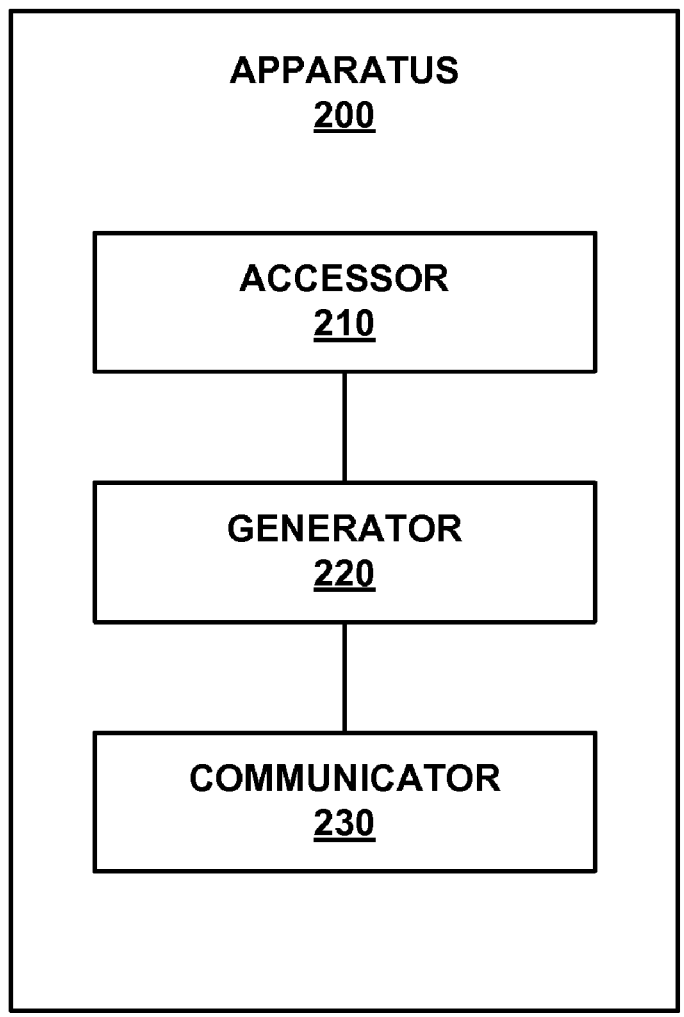
FIG. 2 is a block diagram of an apparatus for generating unique aliases for keys used with tape libraries, according to one embodiment.

FIG. 2 is a block diagram of an apparatus 200 for generating unique aliases for keys used with tape libraries, according to one embodiment. The blocks that represent features in FIG. 2 can be arranged differently than as illustrated, and can implement additional or fewer features than what are described herein. Further, the features represented by the blocks in FIG. 2 can be combined in various ways. The apparatus 200 can be implemented using software, hardware, firmware, or a combination thereof.

The description of the apparatus 200 depicted in FIG. 2 shall refer to FIG. 1. The apparatus 200 includes a unique-tape-library-identifier-accessor 210 (referred to herein as the "accessor"), a unique-key-alias-based-on-unique-tape-library-identifier-generator 220 (referred to herein as the "generator"), and a unique-key-alias-communicator 230 (referred to herein as the "communicator"). The accessor 210 is configured for accessing a library identifier 130 (referred to herein as a "unique library identifier") associated with the first tape library 110 that does not conflict with any other library identifiers, such as tape library identifier 140 associated with tape library 120. The generator 220 is configured for generating a unique key alias 160A based on the library identifier 130. Since the unique key alias 160A is generated based on a unique library identifier 130, the unique key alias 160A does not conflict with any of the other key aliases 160B-160N and 180A-180N associated with the first tape library 110 and the second tape library 120. The communicator 230 is configured for communicating the unique key alias 160A to an encryptor 112 that encrypts the tape data 152 with a data key identified by the unique key alias 160A as a part of writing the tape data 152 to the first tape library 110. The accessor 210, the generator 220 and the communicator 230 are communicatively coupled.

A Method of Generating Unique Aliases for Keys Used with Tape Libraries

Figure 3:
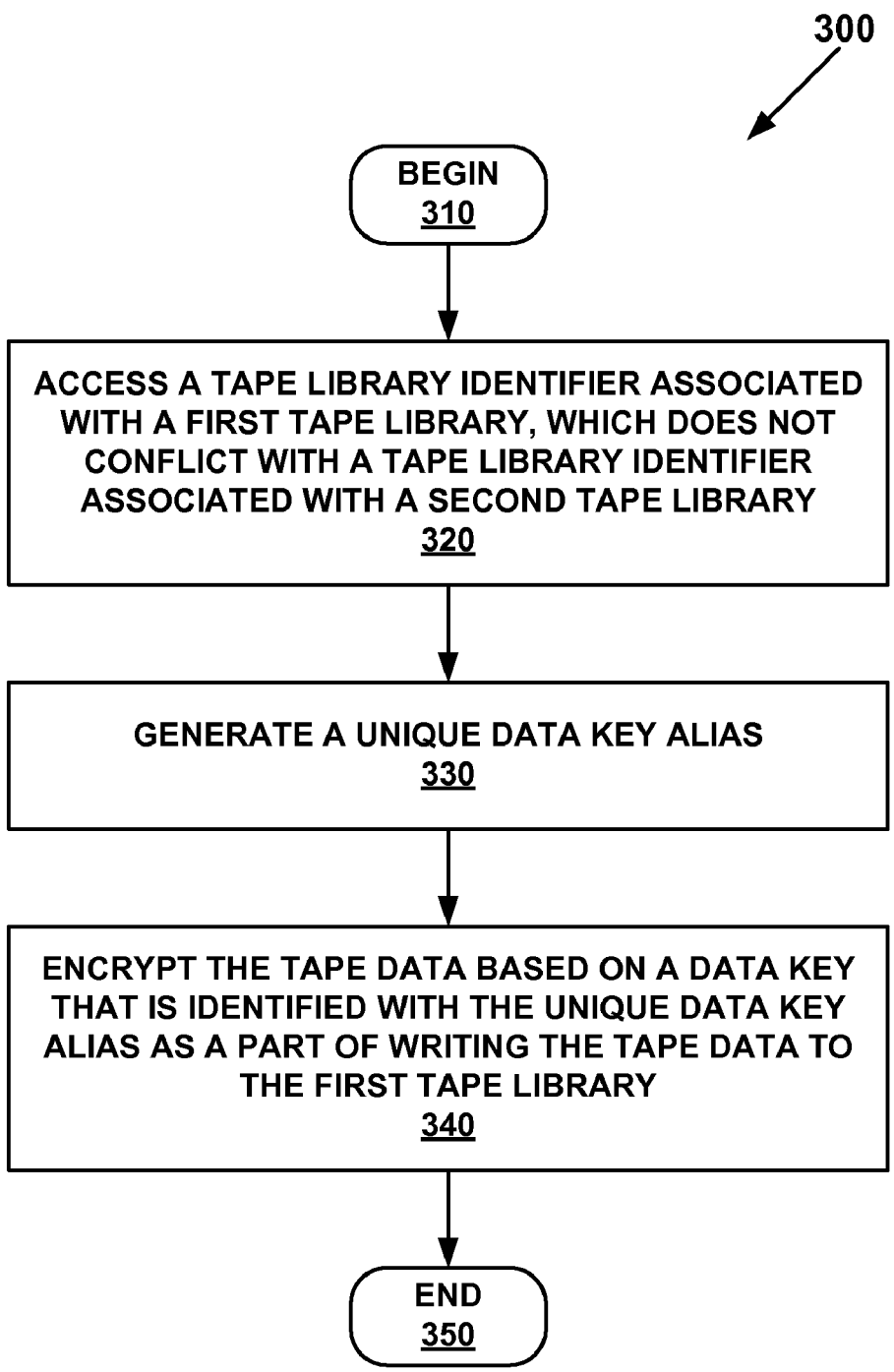
FIG. 3 depicts a flowchart for a method of generating unique aliases for keys used with tape libraries, according to one method.

FIG. 3 depicts a flowchart 300 for a method of generating unique aliases for keys used with tape libraries, according to one method. Although specific steps are disclosed in flowchart 300, such steps are exemplary. That is, embodiments of the present invention are well suited to performing various other steps or variations of the steps recited in flowchart 300. It is appreciated that the steps in flowchart 300 may be performed in an order different than presented, and that not all of the steps in flowchart 300 may be performed.

All of, or a portion of, the embodiments described by flowchart 300 can be implemented using computer-usable media and computer-executable instructions which reside, for example, in computer-usable media of a computer system or like device. The computer-usable media can be any kind of memory that instructions can be stored on. Examples of the computer-usable media include but are not limited to a disk, a compact disk (CD), a digital video device (DVD), read only memory (ROM), flash, and so on. As described above, certain processes and steps of the embodiments of the present invention are realized, in one embodiment, as a series of instructions (e.g., software program) that reside within computer readable memory of a computer system and are executed by the processor of the computer system. When executed, the instructions cause the computer system to implement the functionality of embodiments of the present invention as described below.

The illustration of flowchart 300 shall refer to FIGS. 1 and 2. This illustration shall assume that a unique library identifier 130 includes the 24 bit Organizationally Unique Identifier (represented by OOUUII) and the 24 bit manufacturing assigned portion (represented by) of the World Wide Name (WWN) for tape library 110. For example, assume that a first tape library 110 is being installed. As a part of the installation, IT personnel may input a first library identifier 130. More specifically, the IT personnel may obtain the OOUUII and the NNNNNN from a WWN that is printed on a label that is attached to the first tape library 110. The IT personnel can use a command line interface (CLI) to enter a command that includes at least in part OOUUIINNNNNN. A certificate alias can be generated based on the first tape library 110's unique identifier 130. Similar processing can be performed to generate a certificate alias for a second tape library 120 based on the second tape library 120's unique identifier 140. A tape library may automatically obtain its respective unique library identifier. An apparatus 200 or a key manager associated with a tape library may access a library identifier.

The IT personnel may also enter ranges that can be used as a part of generating key aliases 160A-160N. For example, the IT personnel may enter a command that specifies parameters with the value 09C40A for the NNNNNN, the value 000000 for the OOUUII, and the values 0000-03FF for a range of key aliases 160A-160N. In one embodiment, the IT personnel use a command line interface (CLI) to enter the command "aliasrange key00000009C40A0000-key00000009C40A03FF." Similar processing can be performed with respect to the second tape library 120 to generate key aliases 180A-180N.

At 310, the method begins

At 320, a library identifier associated with a first tape library, which does not conflict with a library identifier associated with a second tape library, is accessed. For example, the accessor 210 accesses the values 09C40A and 000000 for the and the OUI, which the IT personnel input. The combination of these values uniquely identifies the first tape library 110 and therefore can be used as the first tape library 110's unique library identifier 130. The library identifier 130 used in this example would uniquely identify the tape library 110 from all other tape libraries that have been assigned OUIs.

At 330, a unique key alias, which does not conflict with any of the key aliases associated with the first tape library and the second tape library, is generated based on the first tape library's library identifier. For example, a unique key alias 160A is generated based on the library identifier 130. The unique key alias 160A does not conflict with any of the key aliases 160B-160N and 180A-180N associated with the tape libraries 110 and 120.

More specifically, the generator 220 can take the values that were input for the NNNNNN and OOOUUII of the CLI, which are 09C40A and 000000 respectively, and the specified range 0000-03FF and generate a unique key alias range "key0000000009C40A0000-key0000000009C40A03FF", where each key alias associated with the range does not conflict with any other key alias associated with the first tape library and the second tape library. Note that in this example, an additional byte "00" was appended to both of the input parameters "key00000009C40A0000" and "key00000009C40A03FF" resulting in the generated key alias range "key0000000009C40A0000-key0000000009C40A03FF." Assume that key aliases 160A-160N depicted in FIG. 1 represent the unique key aliases associated with the generated key alias range "key0000000009C40A0000-key0000000009C40A03FF." Assume that the unique key alias 160A referred to in the description of 330 is one of the unique key aliases associated with the generated key alias range.

At 340, the tape data is encrypted based on a data key identified by the unique key alias as a part of writing the tape data to the first tape library. For example, the communicator 230 communicates the unique key alias 160A to an encryptor 112. The encryptor 112 encrypts a stream of data 152 (also known as "tape data") that is being written to a tape 150A associated with the first tape library 110.

At 350, the method ends.

Assume that there is a desire to physically move the tape 150A with the tape data 152 that was encrypted at 340 to the second library 120. In this case, a certificate alias for the second tape library 120's key manager may be communicated to the first tape library 110' key manager. Since the first and second tape libraries' identifiers 130, 140 do not conflict with each other, the certificate aliases, which were created based on the respective tape libraries' identifiers 130, 140, associated with the first and second tape libraries 130, 140 will not conflict with each other.

The key alias 160A and the data key that corresponds to the key alias 160A can be encrypted (also referred to as "wrapping") using the second tape library 120's public key associated with its certificate. The wrapped key alias 152 and the corresponding data key can be provided to the second tape library 120 along with the tape 150A from the first tape library 110. Since the first tape library's identifier 130 does not conflict with the second tape library's identifier 140, the key alias 160A, which was generated based on the first tape library's unique identifier 130, will not conflict with any of the second tape library's key aliases 180A-180N.

The second tape library 120 can use a private key associated with its own certificate to decrypt (also referred to as "unwrapping") the data key and the corresponding key alias 160A. The second tape library 120'S key manager can be used to manage the unwrapped data key and key alias 160A. The unwrapped data key associated with the unwrapped key alias 160A can be used to decrypt the tape data 152 on the moved tape 150A.

For the sake of simplicity, the previous illustration assumed that one tape, one data key and one corresponding key alias were transported from the first tape library 110 to the second tape library 120. However, frequently many tapes, a corresponding group of data keys, and a corresponding group of key aliases are transported. In this case, the group of key aliases and the group of data keys are, according to one embodiment, encrypted using the second tape library 120's public key associated with its certificate in preparation of transporting the tapes from the first tape library 110 to the second tape library 120.

Although the previous illustration described communicating the tape data from the first tape library to the second tape library by physically moving the tape that stores the tape data, other examples of "communicating tape data" include transmitting the tape data over a network, among other things. According to one embodiment, when tape data 152 is communicated either by transmitting it over the network or by moving the tape 150A that it is stored on, the second tape library 120 can use the received key alias 160A as a part of decrypting the communicated tape data 152. In the event that the tape data 152 was communicated by transmitting the tape data 152 over a network, the second tape library 120, according to one embodiment, will use one of its own unique key aliases as a part of re-encrypting the transmitted tape data 152 when storing the received tape data 152 onto a tape 170A-170N.

The above illustration is only provided by way of example and not by way of limitation. There are other ways of performing the method described by flowchart 300.

CONCLUSION

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

Various embodiments have been described in various combinations. However, any two or more embodiments may be combined. Further, any embodiment may be used separately from any other embodiments.

What is claimed is:

1. A method of generating unique aliases for keys used with tape libraries, the method comprising:
   accessing a first library identifier associated with a first tape library that does not conflict with a second library identifier associated with a second tape library;
   generating a unique key alias that does not conflict with key aliases associated with the first tape library and does not conflict with key aliases associated with the second tape library based, at least in part, on the first library identifier; and
   encrypting tape data based on a data key that is identified with the unique key alias,
   where generating the unique key alias comprises:
      creating a unique identifier prefix by appending a first portion of the first library identifier onto a second portion of the first library identifier, and
      concatenating the unique identifier prefix with a range value,
   where the first library identifier is a World Wide Name (WWN) identifier,
   where the unique identifier prefix is shorter in length than the WWN identifier,
   where the first portion is a manufacturing assigned portion of the VVWN identifier, and
   where the second portion is an Organizational Unique Identifier (OUI) of the WWN identifier.

2. The method of claim 1, further comprising:
   receiving a certificate alias generated based on the second library identifier, from the second tape library; and
   encrypting the unique key alias based, at least in part, on the received certificate alias.

3. The method of claim 2, further comprising:
   communicating the encrypted tape data and the encrypted unique key alias to a key manager associated with the second tape library; and
   unwrapping, at the second tape library, the encrypted unique key alias based on the certificate alias that resides at the key manager associated with the second tape library.

4. The method of claim 3, further comprising:
   receiving a request at the second tape library to access the encrypted tape data; and
   using the unwrapped unique key alias as a part of decrypting the encrypted tape data.

5. An apparatus for generating unique aliases for keys used with tape libraries, the apparatus comprising:
   a processor;
   a memory; and
   an interface to connect the processor and the memory,
   the processor being configured to perform as:
      an accessor configured for accessing a first library identifier associated with a first tape library that does not conflict with a second library identifier associated with a second tape library;
      a generator configured for generating a unique key alias based, at least in part, on the first library identifier, where the unique key alias is associated with the first tape library and is not associated with the second tape library; and
      a communicator configured for communicating the unique key alias to an encryptor that encrypts tape data with a data key identified by the unique key alias,
      where the generator is configured for generating the unique key alias by creating a unique identifier prefix by appending a first portion of the first library identifier onto a second portion of the first library identifier; and
      concatenating the unique identifier prefix with a range value,
      where the first library identifier is a World Wide Name (WWN) identifier and the unique identifier prefix is shorter in length than the VVWN identifier, where the first portion is a manufacturing assigned portion of the WWN identifier, and where the second portion is an Organizational Unique Identifier (QUI) of the WVVN identifier.

6. The apparatus of claim 5, where the encryptor encrypts the tape data based on the data key identified by the unique key alias.

7. The apparatus of claim 6, further comprising:
   an associator configured for receiving a certificate alias generated based on the second library identifier from the second tape library; and
   where the communicator is configured for communicating the certificate alias to the encryptor that encrypts the unique key alias based, at least in part, on a public key associated with the certificate alias.

8. The apparatus of claim 7, where:
   the first tape library communicates the encrypted tape data and the encrypted unique key alias to a key manager associated with the second tape library; and
   the second tape library unwraps the encrypted unique key alias based on the certificate alias at the key manager associated with the second tape library.

9. The apparatus of claim 8, where:
   the second tape library receives a request to access the encrypted tape data; and
   a decryptor associated with the second tape library decrypts the encrypted tape data using an unwrapped data key associated with the unique key alias.

10. The apparatus of claim 5, where the unique key alias is based on one or more portions of a World Wide Name (WWN) associated with the first tape library, where a first portion of the WWN ensures that the first library identifier does not conflict with any other library identifiers associated with an organization, where a second portion of the WWN in combination with the first portion of the WWN ensures that the first library identifier does not conflict with any other libraries that have been assigned Organizationally Unique Identifiers (OUIs).

11. The apparatus of claim 10, where a portion of the WWN ensures that the first library identifier does not conflict with any other library identifiers associated with tape libraries manufactured by a particular manufacturer.

12. A non-transitory computer-readable medium having computer-executable instructions for performing a method of generating unique aliases for keys used with tape libraries the method comprising:
   accessing a unique alias that does not conflict with aliases associated with a first tape library and does not conflict with aliases associated with a second tape library where the unique alias was generated based, at least in part, on a first library identifier, associated with the first tape library, that does not conflict with a second library identifier associated with the second tape library, where a library identifier is only associated with one tape library; and encrypting tape data based, at least in part, on a key associated with the unique alias, where the unique alias includes a unique identifier prefix created by appending a first portion of the first library identifier onto a second portion of the first library identifier; and a range value concatenated with the unique identifier prefix, where the first library identifier is a World Wide Name (WWN) identifier and the unique identifier prefix is shorter in length than the WWN identifier, where the first portion is a manufacturing assigned portion of the WWN identifier, and where the second portion is an Organizational Unique Identifier (OUI) of the WWN identifier.

13. The non-transitory computer-readable medium of claim 12, further comprising computer executable instructions for:

accessing the unique alias that is a certificate alias; and encrypting a unique key alias based on a public key associated with the certificate alias.

14. The non-transitory computer-readable medium of claim 12, further comprising computer-executable instructions for:

accessing the unique alias that is a unique key alias; and encrypting a stream of data that is being written to the tape based on a data key associated with the unique key alias.

15. The non-transitory computer-readable medium of claim 12, further comprising computer-executable instructions for:

accessing the first library identifier, where the first library identifier was generated based on a serial number associated with the first tape library.

* * * * *